Dec. 19, 1922.  1,439,257
J. OGREN.
TRUCK BODY.
FILED FEB. 16, 1922.
2 SHEETS-SHEET 1
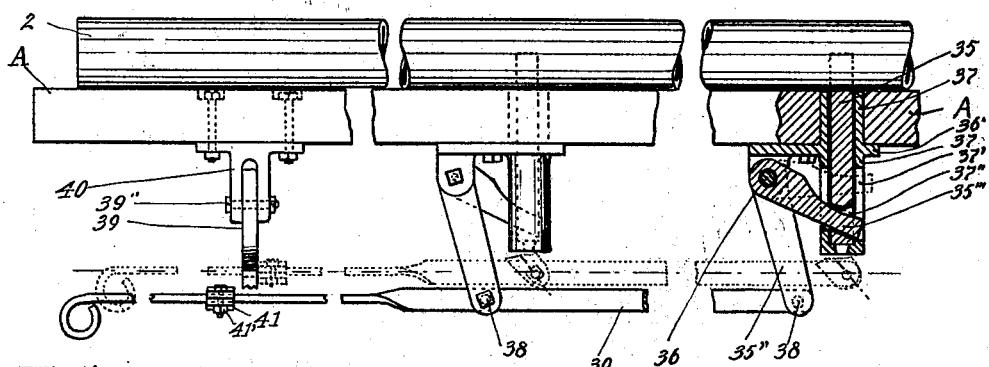
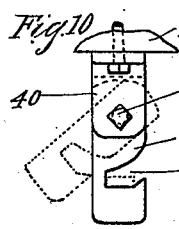
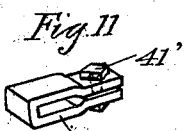
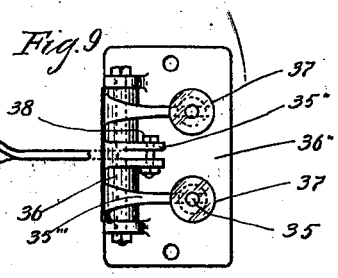
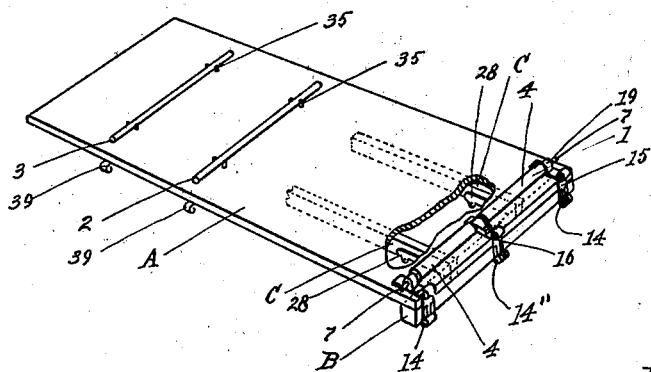
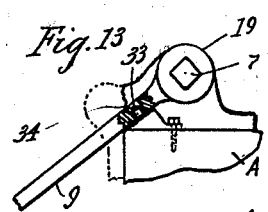
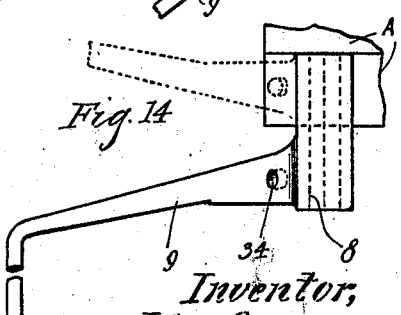
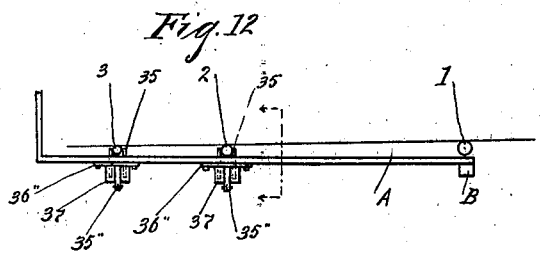
Inventor,
John Ogren
by H. S. Johnson
his Attorney.

Dec. 19, 1922.
J. OGREN.
TRUCK BODY.
FILED FEB. 16, 1922.
1,439,257
2 SHEETS-SHEET 2
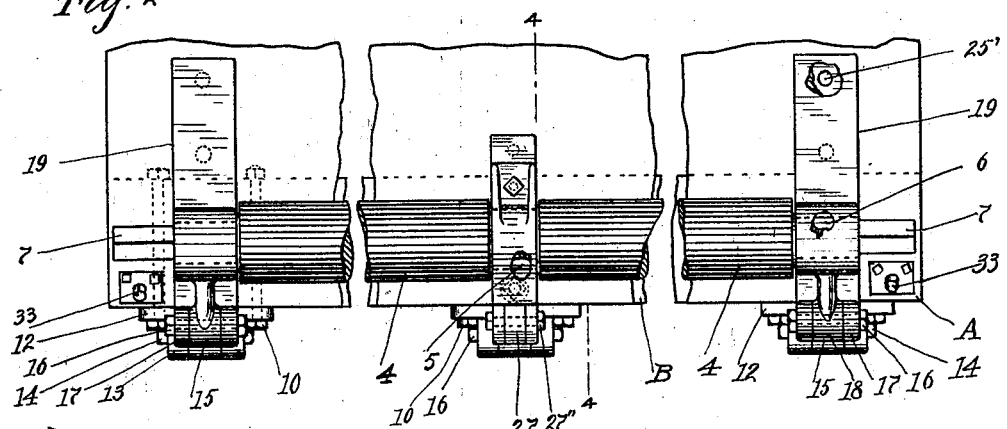
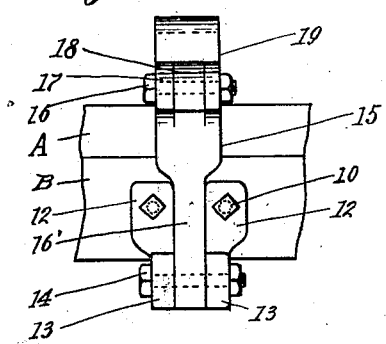
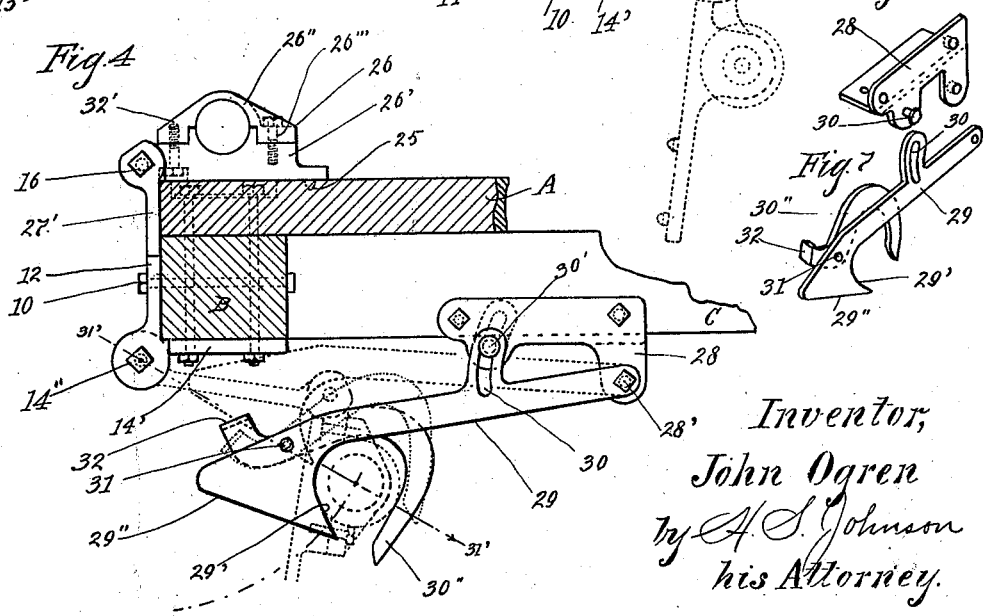
Inventor,
John Ogren
by A. S. Johnson
his Attorney.

Patented Dec. 19, 1922.

1,439,257

UNITED STATES PATENT OFFICE.

JOHN OGREN, OF STILLWATER, MINNESOTA.

TRUCK BODY.

Application filed February 16, 1922. Serial No. 536,929.

*To all whom it may concern:*

Be it known that I, JOHN OGREN, a citizen of the United States, residing at Stillwater, in the county of Washington and State of Minnesota, have invented certain new and useful Improvements in Truck Bodies, of which the following is a specification.

This invention relates to lumber trucks, and more particularly to trucks designed for mechanically unloading or dumping, a pile of lumber as a unit, the principal object of the invention being, the provision of built-in means carried by the truck body, whereby the floor thereof may be easily and readily rendered available for transporting such manufactured mill-work, and other merchandise as requires careful handling during transportation, and which cannot be safely hauled, unless resting upon a flat smooth truck bottom free from shoulders.

In ordinary trucks designed for transporting heavy loads of lumber, ponderous built-in rollers are provided, these rollers extending transversely of the body at intervals throughout the length thereof. In order to sustain heavy loads, and inasmuch as the rollers, are in most cases supported in a pair of journals, one at each end thereof, it is necessary to construct the rollers of relatively large diameter, owing to the relatively long span between the journals. In some of these trucks these heavy rollers are individually removable, by the removal of numerous bolts, and requiring several men to handle a single roller, and leaving wide, deep, transverse grooves in the floor, spaced at intervals throughout the length of the body. To prepare these heavy trucks for carrying ordinary merchandise as stated in the foregoing, requires a considerable period of strenuous labor for one or two men, thereby rendering it unprofitable and impracticable to use these trucks for mixed loads to be hauled alternately at frequent short intervals of time.

Further, the large open channels or grooves, left in the bed of the truck after removal of the rollers, is injurious to mill-work such as cabinets, window frames, and the like, or other finished merchandise, when the load shifts slightly, and it has been the custom to prevent this to provide a portable auxiliary floor.

A further object of the invention, is the provision of roller mechanism, which latter will include a main manually operable roller having an intermediate journal support, whereby the structure may be materially reduced in weight and size, so that it may be readily lifted by one person and swung clear of the bed, means also being provided for automatically holding said roller out of operative position.

A further object of the invention is the provision of rollers which are supported in a manner to bring their uppermost peripheral edges coincident with a plane inclining slightly toward the rear of the truck, said rollers also gradually reducing in size from the rear of the truck forwardly so that the load, on a level road-way, will be slightly inclined rearwardly to assist in preventing an accidental rolling movement of the load with reference to the body.

Other objects and advantages will be pointed out, as this specification progresses, the invention consisting in the construction, combination and arrangement of parts hereinafter described and specifically claimed.

In the accompanying drawings:

Figure 1, is a semi-diagrammatic perspective view of a truck body, drawn to a reduced scale, embodying my invention.

Fig. 2, is a plan view of the rear end of the truck body, showing the swingable main roller, parts thereof being broken away.

Fig. 3, is a side view of same.

Fig. 4, is a vertical sectional view on line 4—4 of Fig. 2.

Fig. 5, is a rear view of the intermediate journal support of the main roller.

Figs. 6 and 7, are perspective views drawn to a reduced scale, of the automatic latch or locking mechanism for the main roller the views showing, respectively, the supporting bracket for the latch bar and the latch bar proper.

Fig. 8, is a rear view of the floor of the truck, showing the larger of the auxiliary rollers, and the manually operable mechanism for holding the auxiliary rollers positioned, said mechanism and floor being partly broken away and shown partly in section.

Fig. 9, is a plan view of the underside of one of the sliding pin elements for holding the auxiliary roller shown partly broken away.

Fig. 10, is a side elevation of the locking member for controlling the sliding pin elements whereby to hold the latter in extended or withdrawn position.

Fig. 11, is a perspective view of a stop adapted to co-act with the locking member.

Fig. 12, is a semi-diagrammatic side elevation of Fig. 1, showing the progressively reduced rollers and their relative location on the truck floor.

Fig. 13, is an end view of the rear end of the truck floor showing one of the squared ends of the main roller, and the portable lever handle in engagement therewith, and Fig. 14, is a plan view of same showing the lever handle in interchangeable positions.

In the drawings, A designates the relatively long rectangular floor of a truck body, B a bolster flush with the rear end thereof, and extending from side to side, and C longitudinal rail members extending spacedly and parallel from said bolster to the forward portion of the truck body. The parts A, B, and C are present in nearly all truck body structures, it being understood that the bolster may be built out to accommodate the invention, in cases where it is not flush with the rear end of the truck.

Applicant's device comprises a main, preferably fluted conveyor roll 1, whereby to roll the load, an intermediate auxiliary roller 2, and a front auxiliary roller 3, the rollers and roll being supported on the truck body, to bring their upper peripheral edges into alinement in a plane which is slightly inclined rearwardly so that lumber piled thereon will not tend to roll off the truck when on a level road.

The main roll comprises a pair of fluted roller sections 4, an intermediate journal bearing 5, between said roller sections, outer journal ends 6, one for each roller section, and squared stub ends 7, forming terminals of the main roll, said stub ends adapted to enter the socket 8, of the lever handle 9, whereby the roll may be manually rotated, when desired.

Firmly bolted as by means of the bolts 10, to the bolster B, is the angle pivot support or bracket 11, said bracket being formed with a pair of spaced upwardly extending web plates 12, through which two of said bolts extend, and a pair of spaced outwardly extending pivot lugs 13 bolted horizontally and transversely of the truck, to receive the pivot pin 14, the space between said plates and lugs being of uniform width, and extending at right angles to the bolster B.

The angle bracket is also provided with a horizontally disposed bolting plate 14' at right angles to the plates 12, and extending flatly over the underside of the bolster and having suitable bolt holes to receive bolts as shown, whereby to be secured to the bolster.

Pivotally supported at its lower extremity on the pin 14, and extending vertically to a point above the floor A of the truck, is the link 15, said link supporting a pivot pin 16 disposed parallel to the pin 14, said pin extending through a pair of spaced lugs 17 somewhat similar to the lugs 13, the shank 16' of the link fitting slidably between the lugs B and the plates 12, whereby to effect long side bearings for said shank to guard against lateral movement of the link.

The lugs 17, are adapted to pivotally receive between them, the lug 18, forming part of the journal box 19. The journal box is formed with a shoulder 20, adapted to engage with the shoulder 21 of the journal box, whereby the underside 22 of the latter, will extend at right angles to the shank of the link, the distance between the pivot pins 14 and 16 being such, as to bring the underside 22 in flat contact with the floor of the truck (Fig. 3.)

The journal box is further provided with a transversely disposed bore 23, in which is journaled the bearing 6, there being one for each end of the roll. The upper outer contour of the journal box is inscribed within the body lines of the roller sections, to permit the lumber to freely roll thereon and tilt to a suitable degree in a dumping operation, as for example at the angle indicated by the dotted line 24'. (Fig. 3).

Projecting from the underside 22 of the journal box at a point forward of the main roll, are the steady pins 25, these pins engaging opening 25', in the floor of the truck, whereby a longitudinal slipping movement of the journal box is effectively resisted. The journal box may be lifted bodily to swing it upon the pivot 16 to thereby disengage the steady pins, when the box and link may be bodily swung to assume the position underneath the truck floor as indicated in dotted lines.

Midway, between the journal boxes 19, is the intermediate journal support 26, said support comprising a base block 26', and a removable cap 26'', held positioned by suitable cap screws 26'''. The journal support is bored to rotatably receive the center bearing 5, of the roll, and is formed with a lug 27, which latter fits between the lugs 13 of the link 27', the latter being substantially similar to the link 15 of the end journal supports. The pivot bolt 27'' of the midway support, is alined with the pivot pins 16, while a pivot pin 14'' (Fig. 4) is correspondingly alined with the pins 14 of the end journal supports, said pin being supported by an angle bracket substantially similar to the angle brackets 11.

Obviously, all of the journal boxes are swingable in unison about the pivot 14, the boxes standing at right angles to the links 15 when in underslung position, as is clearly illustrated in Figs. 3 and 4.

Preferably bolted one to each of the rails C, and extending below the underside thereof, are the brackets 28, the latter located forward of the main roll, and each bracket carrying at its forward end a transversely disposed pivot pin 28'.

Pivotally supported at its forward extremity on said pivot pin is the rearwardly extending latch bar 29, said bar being formed with a hook 29', the jaw thereof opening forwardly and downwardly. A rearwardly inclined edge 29'' forms an approach to the jaw, so that when the roll 1, is swung about the pivot 14, it will strike said inclined edge and thereby lift the latch bar and enter the jaw thereof. The latch bar is held in normal position by the stop pin 30, which latter is carried by the bracket 28, said pin extending loosely through the slot 30' in the latch bar. Coacting with the hook 29' is the secondary hook 30'', the jaw thereof being opposed to that of the hook 29', and adapted to embrace the opposite side of the roll, said secondary hook having pivot support 31, located forward of and above the jaw of the latch bar and approximately in a line 31' intersecting the pivot 14, and the main roll when the latter is in underslung position.

Obviously, the journal boxes and their respective links 15, will tend to straighten out when underslung by a pivotal movement about the pivot 16, if the secondary hook 30'' were not provided, it being obvious that the pull on the secondary hook is exerted in the direction of the line 31'. The pivot 31, constitutes a fulcrum, inasmuch as the body of the hook extends beyond said pivot and is provided with a finger plate 32, whereby the secondary hook may be raised to free the roll, as indicated in the fine dotted lines in Fig. 4. In the operation of depressing the finger plate 32, a lifting movement of the latch bar may be simultaneously performed, to lift the bar out of the path of the roll.

The central journal box 26 is cut away as at 32', to harmonize with the angle indicated by the line 24, Fig. 3, so that in dumping a load of lumber, the links and journal boxes will amply clear, when the load initially strikes the ground.

As stated, in the foregoing, the roll may be rotated in the process of unloading by the use of the crank lever 9. When a load of lumber has been unbound, or, in other words, when the usual chains ordinarily used for binding the lumber into a compact whole, are removed preparatory to unloading, it is very desirable to lock the main roll against accidental rotation, as when the truck stands on an inclined road. For the purpose of so locking the roll, the rearwardly inclined stop pins 33 are provided one at each rear corner of the truck bed. The socket 8 of the crank lever extends parallel to the handle thereof, and an appreciable distance outwardly from the body of the crank lever, so that the latter will clear the truck bed. The lever is provided with an opening 34 adapted to receive the pins 33, so that when the lever is reversed, as shown in Figs. 13 and 14, the opening 34 will cup over the pin 33 and thereby lock the roll against rotation.

The auxiliary rollers 2 and 3 (Fig. 1) are held to prevent rotation thereof, and in parallelism with the main roll by means of the retaining pins 35, one on either side of the roller near opposite ends thereof, said pins projecting from the truck floor and being of lesser height than the diameter of the respective rollers. For the purpose of withdrawing the pins to render the truck floor free from obstructions and permit the rollers to roll forwardly in a dumping operation manually operable individual withdrawing mechanism is provided for the pins of each of said rollers, said mechanism consisting in part of a plurality of devices, one for each pair of pins.

Each of the devices comprise a bell crank 35', having a single arm 35'' and double arms 35''', said arms diverging outwardly at an acute angle relative to each other from a tubular longitudinally disposed hub 36, said arms normally extending downwardly and slightly laterally relative to the truck body. The bell crank is pivotally supported on the pivot bolt 36' which latter extends through said hub and longitudinally of the truck, and is supported in horizontal position by the housing plate 36'' suitably bolted to the underside of the truck floor.

The housing plate is formed with a pair of spaced vertically disposed cylindrical hollow pin supports 37, extending from a point below the housing plate to the top of the truck floor. These pin supports are disposed in alinement, respectively, with the double arms 35''', and are formed with vertical slots 37, through which said arms respectively loosely extend.

Slidable within the pin supports are the aforesaid retaining pins 35, which latter are normally flush with the truck floor and rest on the bottom of the cylindrical pin supports. The pins have slots 37'' through which the arms 35'' respectively extend, so that when the bell crank is caused to be swung on its pivot 36', the pins will be raised to extend their upper extremities a suitable distance above the truck floor level. The arms 35' have pivotal connection 38 with the rod 39, said rod extending to a point adjacent the edge of the truck to be conveniently accessible to be manually actuated to swing the bell cranks. For the purpose of holding the retaining pins in raised position, I provide a dog 39', having pivotal support 39'' on the hanger 40, said hanger being suitably secured to the underside of the truck floor. The dog is further provided with a laterally opening notch 40' adapted to loosely receive the rod 39 as indicated in dotted lines (Fig. 10).

Adjustably clamped on the rod, is the stop clip 41, the latter constituting a U-shaped member, the legs thereof adapted to be clamped into position by the bolt 41'. As indicated in dotted lines, Figure 8, the stop clip rests against the dog 39', when the retaining pins are in extended position.

When it is desired to withdraw the pins preparatory to a dumping operation, the dog may be swung about its pivot 39'' to disengage the shifting rod 39, when the pins will fall by gravity into normal position. The main roll, the links 15 and the journal supports 19 and 26, may be collectively termed a main hinged or swingable load roller support, flexibly connected to the truck, so as to be shiftable from a position above the truck floor to a position underneath same, and the latch bars may be termed "automatic locking means" for locking said roller support bodily within the body lines of the truck body. The auxiliary rollers may be said to be supported directly throughout their length solely by the truck floor and be readily removable therefrom.

I claim:

1. The combination with the floor of a truck body; of a plurality of rollers disposed spacedly transversely of the truck interposed the ends thereof, and lying loosely on the floor thereof, a plurality of stop members movably mounted in the floor and projecting above the surface thereof and located immediately adjacent the respective opposite sides of said rollers to prevent traveling of the latter means for moving said stop members to clear the floor, and a roller in parallelism with said rollers hingedly mounted at the rear end of the truck to be swingable from operative position above the floor to inoperative below the floor.

2. In a truck body of the class described, the combination with the floor of a truck body; of spaced roller devices operatively positioned transversely of the truck body, intermediate the ends thereof and supported on the floor thereof, said devices including mechanism in the floor of the truck body whereby the devices may be readily removed from the surface of the floor, a roller in parallelism with said roller devices and normally located adjacent the rear end of the truck body above the floor thereof, journal supports for said roller, said supports supported by the floor, and pivotal connections between said journal supports and the truck body whereby to enable said roller to be swung from normal position to a position below the floor level.

3. In a truck body, the combination, with the floor thereof, of auxiliary spaced rollers extending transversely of the truck body intermediate the ends thereof, said rollers lying loosely on the floor thereof, a main roller parallel with said auxiliary rollers located adjacent the rear end of the truck body, journal supports for said main roller body, journal supports for said main roller said supports resting on the floor of the truck body, hinge connections between said journal supports and the truck body to render said main roller swingable upwardly from the floor and outwardly and downwardly to a position below the floor, projections on the underside of said journal supports, and openings in the floor adapted to receive said projections for the purpose set forth.

4. In a truck body for the purpose set forth, the combination with the floor thereof, of means including rollers located intermediate the ends of the floor, for rolling the load, said means being constructed to be readily removable to render the floor unobstructed, and a conveyor roll having means for manually rolling the load, swingingly mounted on the rear end of the floor, in a manner to be swung clear of the floor to render the latter a flat surface with no breaks of appreciable size therein.

5. In a roller truck body, the combination with the floor thereof, of auxiliary load rolling devices located intermediate the ends of the floor, said devices being constructed to be readily removable to render the floor unobstructed, a conveyor roll located at the rear of the floor for conveying the load rearwardly over the floor, said conveyor roll being swingably mounted and capable of being swung to a position below the floor level, means for actuating said conveyor roll, and releasable locking means for automatically locking said conveyor roll in a position below the floor level responsive to a swinging movement thereof.

6. In a roller truck body, the combination with the floor thereof, of a main roll swingingly mounted at the rear end of the floor in a manner to be capable of being swung entirely clear of the floor and below the surface thereof, stop devices slidably mounted in the floor and projectible beyond the surface of the floor, actuating means for actuating said stop devices, said actuating means including releasable locking means for holding said devices in projected position, and rollers for rollingly supporting the load, lying loosely between said stop devices to be thereby prevented from rolling.

7. In a conveyor roll for trucks of the class described, the combination with the floor of the truck, of journal supports resting loosely in lateral alinement on the rear end of the truck floor, a roller journaled in said supports, coacting means between the journal supports and the floor for opposing a horizontal shifting movement of said journal supports, links hinged to said journal supports, said links depending from the rear edge of the floor, and hinge connections between the lower ends of said links and the truck body.

8. In a conveyor roll for truck bodies of the class described, the combination, laterally alined end journal supports resting on the rear end of the truck floor, a roller journaled in said supports, hinge connections between said journal supports, and the truck body whereby said roller is rendered swingable to clear the floor, and a journal support for said roller located between said journal supports and having hinge connection with the truck body to swing in unison with said journal supports.

9. In a roller truck body, the combination, with the floor thereof, of auxiliary load rolling devices, said devices including rollers disposed transversely of the floor and located intermediate the ends thereof, said devices constructed to be readily removable to render the floor unobstructed, and a hingedly mounted roller adjacent the rear end of the floor capable of being swung clear of the floor, the upper peripheral edge of all of the rollers being coincident with a plane inclined rearwardly relative to the floor.

In testimony whereof I affix my signature.

JOHN OGREN.